United States Patent
Khraishi et al.

(10) Patent No.: US 7,998,367 B2
(45) Date of Patent: Aug. 16, 2011

(54) METAL-CARBON NANOTUBE COMPOSITES FOR ENHANCED THERMAL CONDUCTIVITY FOR DEMANDING OR CRITICAL APPLICATIONS

(75) Inventors: Tariq A. Khraishi, Albuquerque, NM (US); Marwan S. Al-Haik, Albuquerque, NM (US)

(73) Assignee: STC.UNM, Albuquerque, NM (US)

( * ) Notice: Subject to any disclaimer, the term of this patent is extended or adjusted under 35 U.S.C. 154(b) by 669 days.

(21) Appl. No.: 11/765,946

(22) Filed: Jun. 20, 2007

(65) Prior Publication Data
US 2008/0093577 A1 Apr. 24, 2008

Related U.S. Application Data

(60) Provisional application No. 60/815,302, filed on Jun. 21, 2006.

(51) Int. Cl.
*H01B 1/00* (2006.01)
*H01B 1/14* (2006.01)

(52) U.S. Cl. ........ 252/506; 252/500; 252/502; 252/512; 252/518.1; 252/520.5; 252/520.3; 252/521.1; 252/521.2; 423/22; 423/23; 423/49; 423/53; 423/138; 423/445 R; 423/445 B; 977/778; 977/742; 977/750; 977/752; 977/810; 29/25.01

(58) Field of Classification Search .......... 252/500–511, 252/512, 518.1, 519.5, 520.3, 520.5, 521.1, 252/521.2; 423/360–441, 22, 23, 49, 53, 423/99, 111, 138, 445 R, 445 B; 29/25.01; 977/500, 742, 750, 752, 810
See application file for complete search history.

(56) References Cited

U.S. PATENT DOCUMENTS

| | | | |
|---|---|---|---|
| 6,250,984 B1 * | 6/2001 | Jin et al. | 445/51 |
| 2002/0085968 A1 | 7/2002 | Smalley et al. | |
| 2003/0170166 A1 * | 9/2003 | Smalley et al. | 423/447.1 |
| 2004/0224163 A1 | 11/2004 | Tobita et al. | |
| 2005/0087726 A1 * | 4/2005 | Anazawa et al. | 252/500 |
| 2005/0181209 A1 | 8/2005 | Karandikar | |
| 2006/0047052 A1 | 3/2006 | Barrera et al. | |
| 2007/0036978 A1 | 2/2007 | Chen | |
| 2007/0110977 A1 | 5/2007 | Al-Haik et al. | |
| 2007/0134496 A1 * | 6/2007 | Katagiri et al. | 428/408 |
| 2007/0190348 A1 * | 8/2007 | Ichiki | 428/567 |

FOREIGN PATENT DOCUMENTS

| | | | |
|---|---|---|---|
| KR | 2003-0073157 | * | 3/2006 |
| WO | WO2005-040066 | * | 5/2005 |

OTHER PUBLICATIONS

Zhong et al. ("Fabrication of nano-Al based composite reinforced by single-walled carbon nanaotubes" Carbon. vol. 41, pp. 848-851, Apr. 2003).*

* cited by examiner

*Primary Examiner* — Mark Kopec
*Assistant Examiner* — Tri V Nguyen
(74) *Attorney, Agent, or Firm* — MH2 Technology Law Group LLP

(57) ABSTRACT

According to various embodiments of the present teachings, there is a metal-carbon nanotubes composite and methods of making it. A method of forming a metal-carbon nanotube composite can include providing a plurality of carbon nanotubes and providing a molten metal. The method can also include mixing the plurality of carbon nanotubes with the molten metal to form a mixture of the carbon nanotubes and the molten metal and solidifying the mixture of the carbon nanotubes and the molten metal to form a metal-carbon nanotube composite.

11 Claims, 3 Drawing Sheets

METAL-CARBON NANOTUBE COMPOSITES FOR ENHANCED THERMAL CONDUCTIVITY FOR DEMANDING OR CRITICAL APPLICATIONS

CROSS REFERENCE TO RELATED APPLICATION

This application claims priority to U.S. Provisional Patent Application Ser. No. 60/815,302 filed on Jun. 21, 2006, the disclosure of which is incorporated by reference herein in its entirety.

FIELD OF THE INVENTION

The subject matter of this invention relates to composites. More particularly, the subject matter of this invention relates to metal-carbon nanotube composites and methods for fabricating metal-carbon nanotube composites for enhanced thermal conductivity for demanding or critical applications.

BACKGROUND OF THE INVENTION

Dissipation of heat is critical in the fabrication and functioning of many finished products and also in a wide range of modern manufacturing processes. Many critical or demanding applications require materials with good or excellent thermal conductivity. Exemplary applications where heat dissipation can be demanding include, but are not limited to, IC (integrated circuit) boards (e.g. as packaging material), boilers and heat exchangers, aerospace and automotive industries (e.g. in jet and car engines), metal forging, building materials, nuclear and power plan equipment. Hence, there is an ongoing search for new materials that can provide increased heat tolerance and increased thermal conduction/heat dissipation. One such category of new materials is carbon nanotube composites because carbon nanotubes possess superior thermal conductivity.

Thus, there is a need to solve these and other problems of the prior art and provide methods of forming a metal-carbon nanotube composites.

SUMMARY OF THE INVENTION

In accordance with the invention, there is a method of forming a metal-carbon nanotube composite including providing a plurality of carbon nanotubes and providing a molten metal. The method can also include mixing the plurality of carbon nanotubes with the molten metal to form a mixture of the carbon nanotubes and the molten metal and solidifying the mixture of the carbon nanotubes and the molten metal to form a metal-carbon nanotube composite.

According to various embodiments of the present teachings, there is a method of forming a metal-carbon nanotube composite including providing a plurality of carbon nanotubes and providing powdered metal. The method can also include mixing the plurality of carbon nanotubes with the powdered metal to form a mixture of the carbon nanotubes and the powdered metal and sintering the mixture of the plurality of carbon nanotubes and the powdered metal followed by cooling to form a solid metal-carbon nanotube composite.

According to another embodiment of the present teachings, there is a metal-carbon nanotube composite including a continuous metal phase and a plurality of carbon nanotubes dispersed in the continuous metal phase, wherein the plurality of carbon nanotubes are dispersed in the continuous metal phase by mixing the plurality of carbon nanotubes in molten metal and solidifying the mixture.

According to yet another embodiment of the present teachings, there is a metal-carbon nanotube composite including a continuous metal phase and a plurality of carbon nanotubes dispersed in the continuous metal phase, wherein the plurality of carbon nanotubes are dispersed in the continuous metal phase by mixing the plurality of carbon nanotubes with a powdered metal to form a mixture of the carbon nanotubes and the powdered metal and sintering the mixture followed by cooling.

Additional advantages of the embodiments will be set forth in part in the description which follows, and in part will be obvious from the description, or may be learned by practice of the invention. The advantages will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

DESCRIPTION OF THE EMBODIMENTS

Reference will now be made in detail to the present embodiments, examples of which are illustrated in the accompanying drawings. Wherever possible, the same reference numbers will be used throughout the drawings to refer to the same or like parts.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less that 10" can assume negative values, e.g. −1, −2, −3, −10, −20, −30, etc.

The term "carbon nanotube" is used interchangeably with nanotubes and nanofibers. As used herein, the term "carbon nanotube" refers to any organic, cylindrical shaped material with a diameter of about 100 nanometers or less. The term "carbon nanotube" also refers to single wall nanotube, multi-wall nanotube, and their functionalized and derivatized fibril forms, which include nanofibers.

Figure 1:
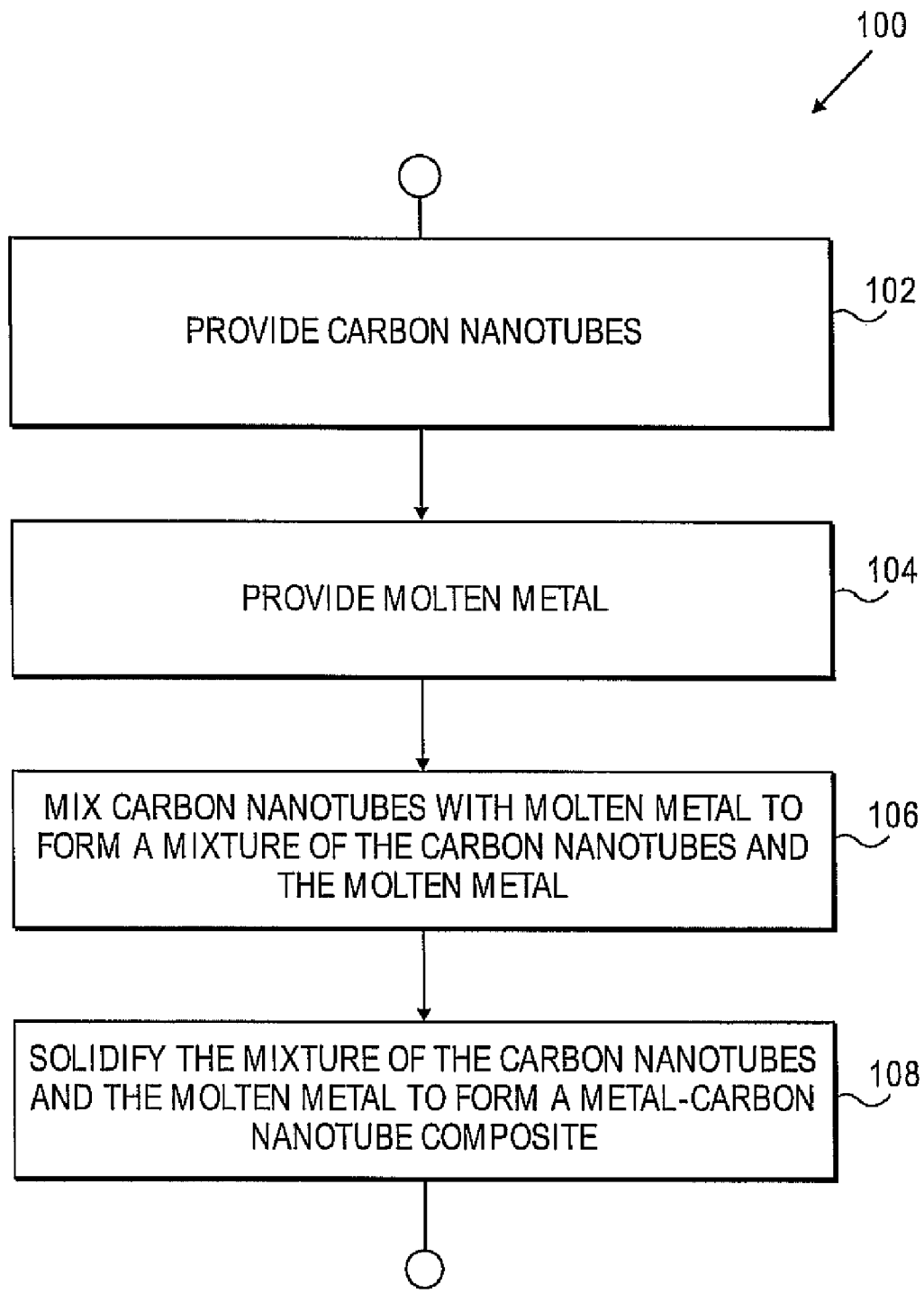
FIG. 1 depicts a flow chart of an exemplary method of forming a metal-carbon nanotube composite, according to various embodiments of the present teachings.

According to various embodiments of the present teachings, there is a method 100 of forming a metal-carbon nanotube composite as shown in FIG. 1. The method 100 can include providing a plurality of carbon nanotubes as shown by 102 in FIG. 1. In various embodiments, the step of providing a plurality of carbon nanotubes can include providing a plurality of carbon nanotubes in a dry fluffy powdery form. In some embodiments, the step of providing a plurality of carbon nanotubes can include providing one or more of a plurality of single wall carbon nanotubes (SWNT) and a plurality of multi wall carbon nanotubes (MWNT). In other embodiments, the step of providing a plurality of carbon nanotubes can include providing a plurality of carbon nanotubes with one or more chiralities. In some other embodiments, the method can further include providing a plurality of carbon nanotubes dispersed in a solvent. In various embodiments, a plurality of carbon nanotubes can be dispersed in an alcohol, such as, for example ethanol. In other embodiments, the method 100 can include providing a plurality of carbon nanotubes dispersed in a polymer resin. Exemplary resins for dispersing carbon nanotubes include, but are not limited to DERAKANE 411-350 epoxy vinyl ester resin manufactured by Ashland Inc. (Covington, Ky.) and Aeropoxy adhesives manufactured by PTM&W Industries (Santa Fe Springs, Calif.). In some embodiments, dispersing carbon nanotubes in a resin can include first dispersing carbon nanotubes in a solvent, such as an ethanol, and then ultrasonically mixing the carbon nanotubes/ethanol mixture, for example, at about 10% amplitude for about 90 seconds using the high-intensity ultrasonic processor. Meanwhile, the resin can also be ultrasonically mixed with ethanol at about 10% amplitude for about 90 seconds. The carbon nanotubeslethanol mixture can then be combined with the resin/ethanol mixture and ultrasonically mixed at about 50% amplitude for about 90 seconds. This process can promote the distribution of nanotubes over the surface of the resin molecules and prevent carbon nanotube clustering.

Figure 3:
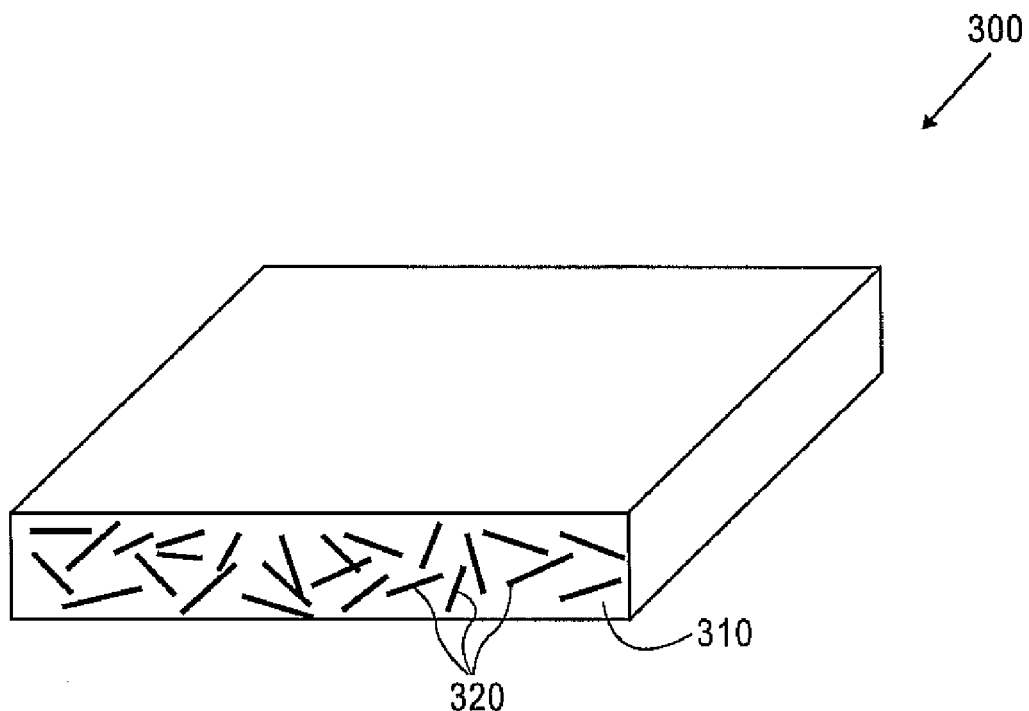
FIG. 3 illustrates an exemplary metal-carbon nanotube composite in accordance with various embodiments of the present teachings.

The method 100 of forming a metal-carbon nanotube composite, as shown in FIG. 1 can also include providing molten metal as in 104. In various embodiments, the metal can be one of, for example, zinc, silver, gold, iron, aluminum, copper, tungsten, cobalt, chromium, nickel, and platinum or their alloys. The method 100 can also include mixing the plurality of carbon nanotubes with the molten metal to form a mixture of the carbon nanotubes and the molten metal as in 106 of FIG. 1. In various embodiments, the molten metal and the carbon nanotubes can be mechanically mixed in a ceramic or a refractory metal mixer. However, one of ordinary skill in the art may choose any other suitable mixing technique to mix the molten metal and the carbon nanotubes. The solvent and the polymer resin will dissipate or evaporate after mixing carbon nanotubes with the molten metal. The method 100 of forming a metal-carbon nanotube composite can further include solidifying the mixture of the carbon nanotubes and the molten metal to form a metal-carbon nanotube composite, as in 108 of FIG. 1. FIG. 3 shows an exemplary metal-carbon nanotube composite 300 made by the disclosed method, wherein the carbon nanotubes 320 are randomly oriented within the metal matrix 310.

Figure 4:
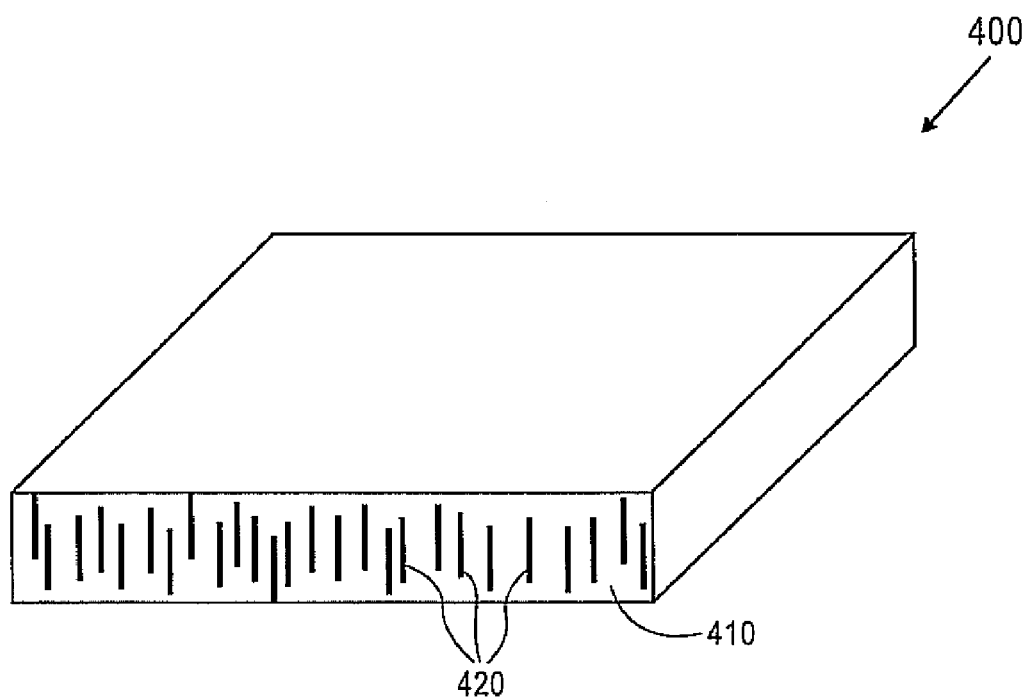
FIG. 4 illustrates another exemplary metal-carbon nanotube composite, according to various embodiments of the present teachings.

In various embodiments, the method 100 of forming a metal-carbon nanotube composite can further include aligning the plurality of carbon nanotubes in a spatial direction in the metal matrix. FIG. 4 shows an exemplary metal-carbon nanotube composite 400, wherein the plurality of carbon nanotubes 420 are aligned in one spatial direction within the metal matrix 410. In some embodiments, the mixture of the carbon nanotubes and the molten metal can be subjected to a tensile stretching force, thereby causing metal crystals and/or grains and carbon nanotubes to align along a tensile axis.

Figure 2:
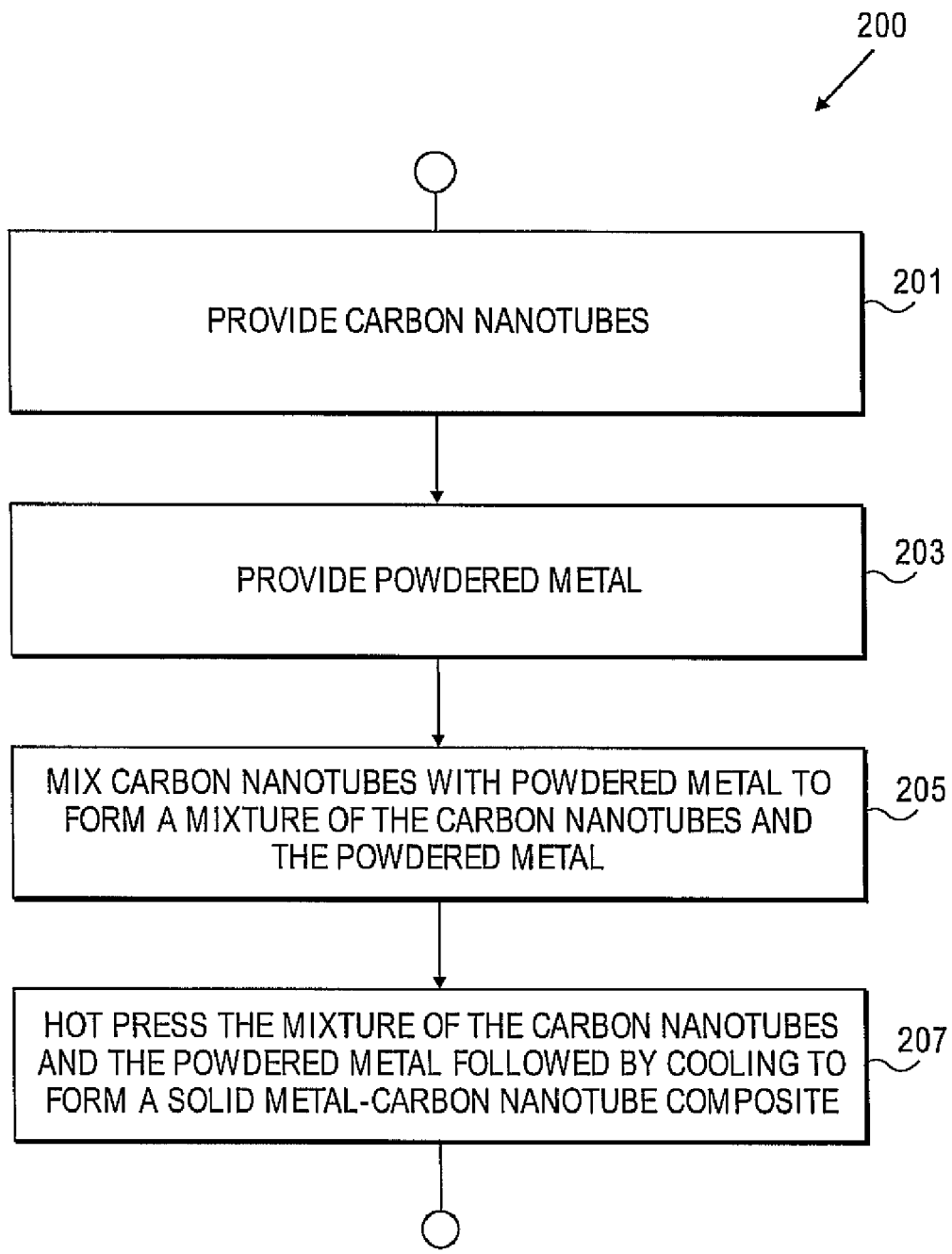
FIG. 2 depicts a flow chart of another exemplary method of forming a metal-carbon nanotube composite, according to various embodiments of the present teachings.

According to various embodiments, there is another method 200 of forming a metal-carbon nanotube composite as shown in FIG. 2. The method 200 can include providing a plurality of carbon nanotubes as in 201 and providing powdered metal as in 203. In various embodiments, the step 201 of providing a plurality of carbon nanotubes can include providing one or more of a plurality of single wall carbon nanotubes (SWNT) and a plurality of multi wall carbon nanotubes (MWNT). In some embodiments, the step 201 of providing a plurality of carbon nanotubes can include providing a plurality of carbon nanotubes with one or more chiralities. In various embodiments, the step of providing a plurality of carbon nanotubes can include providing a plurality of carbon nanotubes in a dry fluffy powdery form or dispersed in liquid alcohol. In other embodiments, the powdered metal can be, for example, zinc, silver, gold, iron, aluminum, copper, tungsten, cobalt, chromium, nickel, platinum or their alloys. In various embodiments, the powdered metal can be from nanometer sized to micron sized. In some embodiments, the powdered metal can be from about 500 nm to about 100 μm in size. The method 200 of forming a metal-carbon nanotube composite can also include mixing the plurality of carbon nanotubes with the powdered metal to form a mixture of the carbon nanotubes and the powdered metal as in step 205 of FIG. 2. The method 200 can further include sintering the mixture of the plurality of carbon nanotubes and the powdered metal followed by cooling to form a solid metal-carbon nanotube composite, as in 207 of FIG. 2. In various embodiments, the sintering can be carried out in a vacuum or in an inert environment, such as, for example, nitrogen, helium, and neon. In various embodiments, sintering of the mixture of the plurality of carbon nanotubes and the powdered metal can include, but is not limited to hot isostatic pressing, microwave sintering, and combinations thereof. In various embodiments, the sintering of the mixture of the carbon nanotubes and the powdered metal can be carried out at a pressure of about 20,000 psi to about 60,000 psi. In other embodiments, the sintering of the mixture of the carbon nanotubes and the powdered metal can be carried out at a pressure of about 20,000 psi to about 30,000 psi. In various embodiments, the sintering of the mixture of the carbon nanotubes and the powdered metal can be carried out at a temperature from about 0.1 to about 0.9 times the melting point temperature of the powdered metal. In some embodiments, the sintering of the mixture of the carbon nanotubes and the powdered metal can be carried out at a temperature from about 0.25 to about 0.75 times the melting point temperature of the powdered metal. In other embodiments, the sintering of the mixture of the carbon nanotubes and the powdered metal can be carried out for about 2 hours to about 100 hours. One of ordinary skill in the art would know that the sintering conditions such as temperature, pressure, and time are interrelated and are dependent on the powdered metal used. Therefore, one can use higher temperature and/or pressure in order to reduce sintering time and so on.

In various embodiments, the method 200 can also include aligning the carbon nanotubes in one desired spatial direction in the mixture of the carbon nanotubes and the powdered metal after the step of hot isostatic pressing or sintering of the mixture of the carbon nanotubes and the powdered metal. In some embodiments, the mixture of the carbon nanotubes and the powdered metal after the step of sintering can be subjected to a tensile stretching force, thereby causing metal crystals and/or grains and carbon nanotubes to align along a tensile axis. In various embodiments, there is a metal-carbon nanotube composite formed by the disclosed method.

According to various embodiments of the present teachings, there is a metal-carbon nanotube composite 300 as shown in FIG. 3. The metal-carbon nanotube composite 300 can include a continuous metal phase 310 and a plurality of carbon nanotubes 320 dispersed in the continuous metal phase 310. In some embodiments, the plurality of carbon nanotubes 320 can be dispersed in the continuous metal phase 310 by mixing the carbon nanotubes 320 in molten metal 310 and solidifying the mixture. In other embodiments, the plurality of carbon nanotubes 320 can be dispersed in the continuous metal phase 310 by mixing the plurality of carbon nanotubes 320 with powdered metal to form a mixture of the carbon nanotubes and the powdered metal and sintering the mixture followed by cooling. In various embodiments, the continuous metal phase 310 can be, for example, zinc, silver, gold, iron, aluminum, copper, tungsten, cobalt, chromium, nickel, platinum, or an alloy of these metals. In other embodiments, the plurality of carbon nanotubes 320 can have one or more chiralities. In various embodiments, the plurality of carbon nanotubes 320 can be present in an amount less than approximately 20% by weight. In some embodiments, the plurality of carbon nanotubes 320 can be randomly oriented in the continuous metal phase 310, as shown in FIG. 3. In other embodiments, the plurality of carbon nanotubes 420 can be aligned in a spatial direction in the continuous metal phase as shown in FIG. 4.

According to the rule of mixtures, the metal-carbon nanotube composite 300, 400 can have much better heat/thermal conduction over the pure metal 310, 410. Also, the metal-carbon nanotube composite 400 including a plurality of aligned carbon nanotubes 420 in a spatial direction as shown in FIG. 4 can produce better heat/thermal conduction along the preferred spatial direction in comparison to the metal-carbon nanotube composite 300 including a plurality of randomly oriented carbon nanotubes 320, as shown in FIG. 3. Furthermore, the metal-carbon nanotube composite 300, 400 including carbon nanotubes having one or more chiralities can have very high thermal conductivity.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising."

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of forming a metal-carbon nanotube composite comprising:
   providing a plurality of carbon nanotubes;
   providing powdered metal;
   mixing the plurality of carbon nanotubes with the powdered metal to form a mixture of the carbon nanotubes and the powdered metal;
   sintering the mixture of the plurality of carbon nanotubes and the powdered metal followed by cooling to form a solid metal-carbon nanotube composite; and
   aligning the carbon nanotubes of the sintered solid metal-carbon nanotube composite.

2. The method of claim 1, wherein the step of providing a plurality of carbon nanotubes comprises providing one or more of a plurality of single wall carbon nanotubes (SWNT) and a plurality of multi wall carbon nanotubes (MWNT).

3. The method of claim 1, wherein the step of providing a plurality of carbon nanotubes comprises providing a plurality of carbon nanotubes with one or more chiralities.

4. The method of claim 1 further comprising providing a plurality of carbon nanotubes in a dry fluffy powdery form or dispersed in a liquid alcohol.

5. The method of claim 1, wherein the metal is selected from the group consisting of zinc, silver, gold, iron, aluminum, copper, tungsten, cobalt, chromium, nickel, platinum and alloys thereof.

6. The method of claim 1, wherein the step of sintering the mixture of the plurality of carbon nanotubes and the powdered metal comprises one or more of hot isostatic pressing and microwave sintering of the mixture of the plurality of carbon nanotubes and the powdered metal.

7. The method of claim 1, wherein aligning the carbon nanotubes of the sintered solid metal-carbon nanotube composite, further comprises:
   aligning the carbon nanotubes along a tensile axis.

8. The method of claim 1, wherein aligning the carbon nanotubes of the sintered solid metal-carbon nanotube composite, further comprises:
   applying a tensile stretching force to the sintered solid metal-carbon nanotube composite.

9. The method of claim 8, wherein applying a tensile stretching force, further comprises:
   applying one method selected from extrusion, hot wire drawing, or hot rolling to the sintered solid metal-carbon nanotube composite.

10. The method of claim 1, wherein aligning the carbon nanotubes of the sintered solid metal-carbon nanotube composite, further comprises:
    aligning metal grains of the solid metal-carbon nanotube composite to produce a composite having anisotropic properties.

11. The method of claim 10, wherein the anisotropic properties comprise mechanical properties, heat conduction properties, and electrical conduction properties.

* * * * *